United States Patent
Sato et al.

(10) Patent No.: US 11,960,862 B2
(45) Date of Patent: Apr. 16, 2024

(54) SOURCE CODE CORRECTION ASSISTANCE APPARATUS AND SOURCE CODE CORRECTION ASSISTANCE METHOD

(71) Applicant: Hitachi, Ltd., Tokyo (JP)

(72) Inventors: Naoto Sato, Tokyo (JP); Huyen Thi Thanh Phan, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 180 days.

(21) Appl. No.: 17/833,518

(22) Filed: Jun. 6, 2022

(65) Prior Publication Data

US 2022/0405063 A1  Dec. 22, 2022

(30) Foreign Application Priority Data

Jun. 18, 2021 (JP) .................. 2021-101977

(51) Int. Cl.
  *G06F 8/33* (2018.01)
  *G06F 11/36* (2006.01)

(52) U.S. Cl.
  CPC ............ G06F 8/33 (2013.01); G06F 11/3612 (2013.01)

(58) Field of Classification Search
  CPC .......................... G06F 8/33; G06F 11/3612
  See application file for complete search history.

(56) References Cited

U.S. PATENT DOCUMENTS

| | | | | |
|---|---|---|---|---|
| 8,479,169 | B1 * | 7/2013 | Evans | G06F 11/3604 717/131 |
| 2016/0147645 | A1 * | 5/2016 | Kandpal | G06F 11/3688 717/124 |
| 2021/0382810 | A1 * | 12/2021 | Kirinuki | G06F 11/3664 |
| 2023/0028595 | A1 * | 1/2023 | Usui | G06F 9/455 |

FOREIGN PATENT DOCUMENTS

| | | |
|---|---|---|
| JP | 2013196350 A | 9/2013 |
| JP | 2014021686 A | 2/2014 |
| JP | 2020067859 A | 4/2020 |

OTHER PUBLICATIONS

Hui Liu, Automated verification and test case generation for input validation, AST '06: Proceedings of the 2006 international workshop on Automation of software test, May 2006, pp. 29-35 (Year: 2006).*

Jane Huffman Hayes, Input validation analysis and testing, Oct. 27, 2006, vol. 11, pp. 493-522 (Year: 2006).*

* cited by examiner

*Primary Examiner* — Wei Y Zhen
*Assistant Examiner* — Amir Soltanzadeh
(74) *Attorney, Agent, or Firm* — Procopio, Cory, Hargreaves & Savitch LLP

(57) ABSTRACT

A source code correction assistance apparatus is configured to include a storage device that stores an updated source code, and an arithmetic operational device that generates, as an evaluation code template of the updated source code, a template including a conditional branch sentence related to each case of success or failure of an input condition, notifies an evaluator terminal of a request to create an evaluation code based on the template, controls an access to the updated source code by the evaluator, receives editing by the evaluator on the conditional branch sentence in the template, generates a list of input values for executing all control paths of the evaluation code after the editing, and generates an evaluation code driver that automatically executes the evaluation code by inputting the input value.

8 Claims, 18 Drawing Sheets

FIG. 8

```
def main(x, y):
    if x>0 and y>0:
        e = compare(x, y)
        return e
    elif x>0 and y<=0:
        return "x is high"
    elif x<=0 and y>=0:
        return "x is low"
    else:
        e = compare(x, y)
        return e def compare(x, y) {
    e = x / y
    if e >= 1:
        return "x is high"
    else:
        return "x is low"
```

DEFECT (SPECIFICATION NOT COINCIDENCE) THAT CODE IS "low" ALTHOUGH CODE SHOULD BE "high" WHEN x=0 AND y=0 HAS OCCURRED

*IN SPECIFICATION,
x IS EQUAL TO OR MORE THAN y → "x is high"
x IS LESS THAN y → "x is low"

*FIG. 9*

```
def main_updated(x, y):
  if x==0 and y==0:
    return "x is high"
  else
    e = compare(x, y)
    return e def compare(x, y) {
  e = x / y
  if e >= 1:
    return "x is high"
  else:
    return "x is low"
```

ERROR WHEN x==0 and y==0 IS CORRECTED, BUT ZERO SPLIT OCCURS WHEN (x<0 and y==0) or (x>0 and y==0)

<PRE-UPDATE SOURCE CODE>

SOLID LINE: INCLUDING BOUNDARY
BROKEN LINE: NOT INCLUDING BOUNDARY

ERROR OCCURRING

REGION 1
REGION 2
REGION 3
REGION 4
REGION 5
REGION 6

$y = x$

<UPDATED SOURCE CODE>

OCCURRING OF DEFECT OF ZERO SPLIT

REGION A
REGION B
REGION C $y = x$

FIG. 12

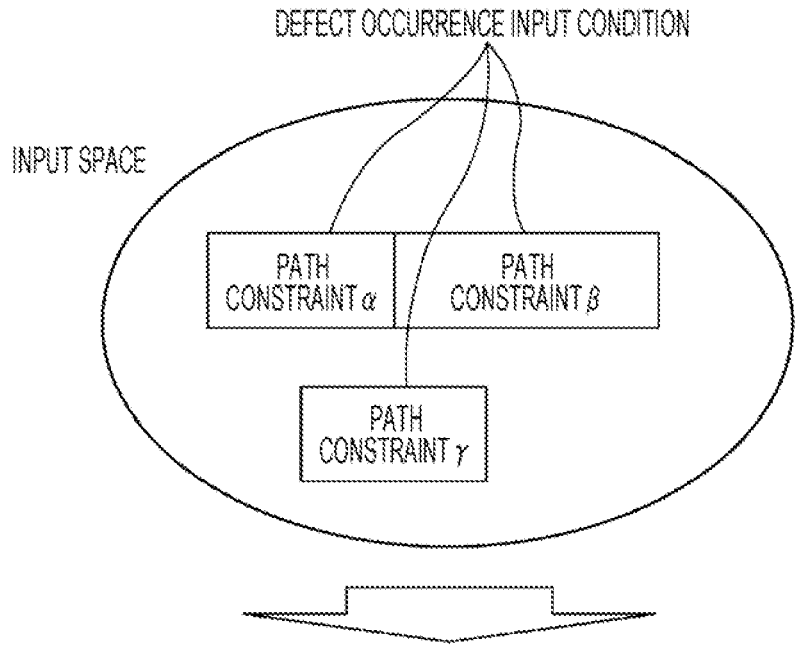

⟨EXTRACT DEFECT OCCURRENCE INPUT CONDITION BY PERFORMING SYMBOLIC EXECUTION ON PRE-UPDATE SOURCE CODE⟩

⟨UPDATE SOURCE CODE FOR CORRECTION⟩

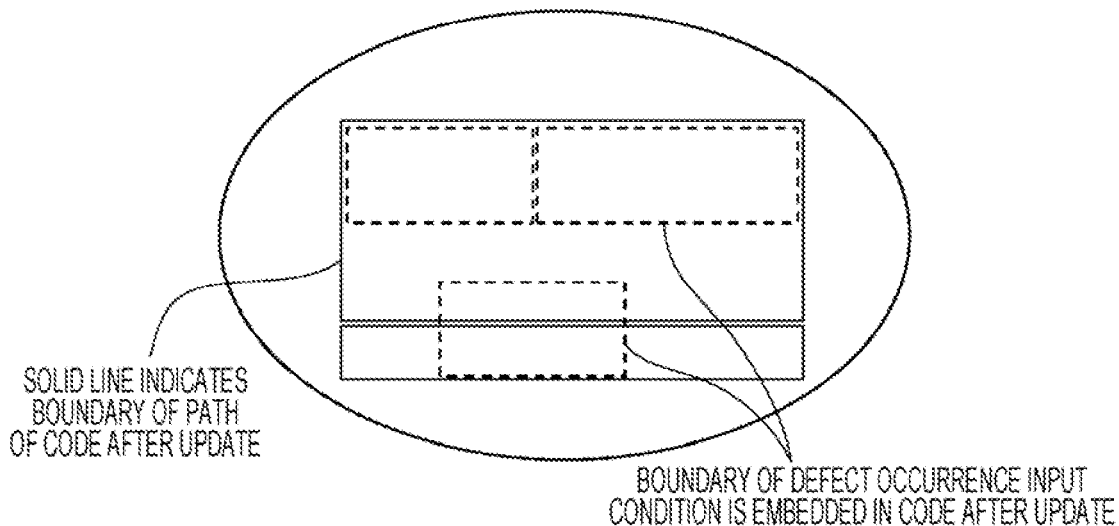

SOLID LINE INDICATES BOUNDARY OF PATH OF CODE AFTER UPDATE

BOUNDARY OF DEFECT OCCURRENCE INPUT CONDITION IS EMBEDDED IN CODE AFTER UPDATE

ERROR LIKELIHOOD IN DEFECT CORRECTION REFERS TO BOUNDARY OF DEFECT OCCURRENCE INPUT CONDITION, BUT, SINCE BOUNDARY THEREOF IS EMBEDDED IN CODE AFTER UPDATE, PROBABILITY OF MISSING ERROR IN CORRECTION IS HIGH WHEN ONLY CODE AFTER UPDATE IS REVIEWED
→ REDUCE MISSING OF SUCH CORRECTION ERROR BY EVALUATION CODE TEMPLATE

FIG. 17

```
int spec(x, y):
  if x<=0 and y>=0 and x==0 and y==0:
    if x==0:
      if y==0:
        return "x is high"
      else:
        return "x is high"
    else:
      if y==0:
        return "x is high"
      else:
        return "x is high"
    ...

else:
    if x==0:
      if y>0:
        if x/y >= 1:
          if x==y:
            return main(x, y)
          else:
            ...
      else:
        if y==0:
          if x>0:
            return main(x, y)
          else:
            return main(x, y)
    ...
```

EVALUATOR WRITES EXPECTED OUTPUT VALUE FOR EACH BOUNDARY CONDITION OF DEFECT OCCURRENCE INPUT CONDITION
→DETECT ZERO SPLIT BY PERFORMING TEST

DETECT ZERO SPLIT BY PERFORMING TEST FOR CASE OF y==0

FIG. 18

```
int main() {
    inputs = []
    paths = symbolicExec(spec)
    for path in paths:
        x, y = Ints("x" "y")
        solver = Solver()
        solver.add(path.constraint)
        solver.check()
        m = solver.model
        inputs.append(m)

for m in inputs:
        result = main_updated(m[x], m[y])
        spec = spec(m[x], m[y])
        assert(result==spec)
} int spec(x, y):
    if x<=0 and y>=0 and x==0 and y==0:
        if x==0:
            if y==0:                          ← SELECTION
                #DEFINE EXPECTED OUTPUT VALUE HERE
            else:                             ← SELECTION
                #DEFINE EXPECTED OUTPUT VALUE HERE
        else:
            if y==0:
                #DEFINE EXPECTED OUTPUT VALUE HERE
            else:
                #DEFINE EXPECTED OUTPUT VALUE HERE
        ...
```

PRESS

COMBINE

FIG. 19

```
int main() {
    inputs = []
    paths = symbolicExec(spec)
    for path in paths:
        x, y = Ints("x" "y")
        solver = Solver()
        solver.add(path.constraint)
        solver.check()
        m = solver.model
        inputs.append(m)

for m in inputs:
        result = main_updated(m[x], m[y])
        spec = spec(m[x], m[y])
        assert(result==spec)
}
int spec(x, y):
    if x<=0 and y>=0 and x==0 and y==0:
        if x==0:
            if True:                          TOOL MERGES CONDITIONAL
                                              BRANCH SENTENCE
        else:
            if y==0:
                #DEFINE EXPECTED OUTPUT VALUE HERE
            else:
                #DEFINE EXPECTED OUTPUT VALUE HERE
            ...
```

[ COMBINE ]

↓

```
...(OMISSION)...

int spec(x, y):
    if x<=0 and y>=0 and x==0 and y==0:
        if x==0:
            if True:
                return "x is high"             AFTER MERGE, USER ADDS
        else:                                  EXPECTED OUTPUT VALUE
            if y==0:
                #DEFINE EXPECTED OUTPUT VALUE HERE
            else:
                #DEFINE EXPECTED OUTPUT VALUE HERE
            ...
```

FIG. 20

ACTUAL SOURCE CODE OF EVALUATION CODE

```
int spec(x, y, z, k):
    if k!=1 and y<=0:
        if k<1 and y=0:
            k=1
        elif k<1 and y<0:
            ...
        elif k>1 and y==0:
            ...
        elif k>1 and y<0:
            ...
```

```
int spec(x, y, z, k):
    if k!=1 and y<=0:
        if k<1 and y=0:
            k=1
        elif k<1 and y<0:
            ...
        elif k>1 and y==0: [k=1]
            ...
        elif k>1 and y<0:
            ...
```

NOT PERFORM BRANCH MERGE ON ACTUAL CODE

COPY EXPECTATION OUTPUT VALUE

SOURCE CODE CORRECTION ASSISTANCE APPARATUS AND SOURCE CODE CORRECTION ASSISTANCE METHOD

CROSS-REFERENCE TO RELATED APPLICATION

This application claims priority pursuant to Japanese patent application No. 2021-101977, filed on Jun. 18, 2021, the entire disclosure of which is incorporated herein by reference.

BACKGROUND

1. Technical Field

The present invention relates to a source code correction assistance apparatus and a source code correction assistance method.

2. Related Art

A test is generally used as means for detecting a defect in software. However, in a case of software having a large number of input parameters and a wide range of possible values of each parameter, it is difficult to comprehensively test all combinations of input values. This corresponds to a situation called a so-called combination explosion.

Therefore, in a case where a defect occurring under & rare condition has been built in software, it is not possible to detect the defect by a test before the operation, and the defect may appear after the actual operation. When the defect occurs after the actual operation, information as a clue to cause analysis cannot be sufficiently acquired in many cases. In that case, it may take time to specify a defect occurrence condition.

As a result, there is a problem that correction of the defect is delayed, which may lead to a long-term system stop or a large-scale recall.

As a conventional technique for coping with such a problem, for example, a technique (see JP 2014-21686 A) for reducing the cost of a test, after program modification by using test resources before the program modification has been proposed.

This technique shows a method of, in a case where an occurrence of a defect is detected from logs, presenting an input condition causing the defect to occur and an execution path at that time. Thus, a software developer can recognize the location in which the defect has occurred and the condition causing the defect to occur, and can examine a correction policy. In addition, this makes it possible to shorten the time taken to correct the defect.

In addition, an information processing apparatus (see JP 2013-196350 A) that improves detection efficiency of a test result suspected of erroneous determination has also been proposed.

The information processing apparatus includes: a first, acquisition unit that acquires a first symbolic execution result including a path condition indicating a series of conditional expressions related to a first execution path and a mathematical expression indicating a return value related to the first execution path in a case where an input value in which an expected value is returned from both a first program and a second program in which the first program is changed is given to the first program; a second acquisition unit that acquires a second symbolic execution result including a path condition indicating a series of conditional expressions related to a second execution path and a mathematical expression indicating a return value related to the second execution path in a case where the input value is given to the second program; a determination unit that determines a degree of reliability serving as an index of the degree of trust related to a test result of the second program by the input value, based on whether or not the path condition in the first symbolic execution result acquired by the first acquisition unit includes the path condition in the second symbolic execution result acquired by the second acquisition unit or whether or not the mathematical expressions in the first and second symbolic execution results coincide with each other; and an output unit that outputs the degree of reliability determined by the determination unit.

Further, a technique (see JP 2020-67859 A) for providing a test data generation device, a test data generation method, and a program capable of reducing the number of man-hours for testing a Web application and the like has also been proposed.

This technique relates to a test data generation device that generates test data of a test related to screen transition provided by a Web application. The test data generation device includes a selection reception unit that receives a selection of one or more screen transitions among the screen transitions, an extraction unit that analyzes source codes of the Web application by using a description specification of a constraint prescribed or defined in a framework of the Web application and extracts the constraint from the source codes, and a generation unit that generates a plurality of pieces of test data satisfying test viewpoints of equivalence division and boundary value analysis by using the constraint of an input form included in a screen as a transition source of the selected screen transition.

SUMMARY

By applying the above-described prior art, it is possible to efficiently specify a defect that has occurred during an actual operation. However, since the correction of the defect is performed manually, there is a probability of an error or omission of correction, or regression.

In order to prevent such correction errors, it is important to test the corrected software. However, considering that it is not possible to detect the defect by the test before an operation, the known test code is not effective.

Therefore, it is necessary to create a new test code. On the other hand, in a case where a developer who has corrected the source code is also responsible for creating the test code, there is a high probability that an error similar to the source code is embedded in the test code.

Therefore, usually source code review is performed by an evaluator. However, the evaluator reviews the source code in which the error is already embedded, thus there is a probability that the evaluator falls into the same thought as the developer and misses the error.

In particular, in a case where the specification of the software is complex or ambiguous, and a plurality methods for implementing the specification are conceivable, the developer may correct not only a portion directly related to the defect but also the entire structure of the source, codes from the viewpoint of increasing an execution speed and improving readability of the source codes.

As a result, there is a case where the corrected source code is configured by a control flow in which the source code is branched in a condition different from the "input condition causing a defect to occur" (which may be specified by the technique in JP 2014-216.86 A). In such a case, the evaluator cannot correctly check whether a process related to the "input condition causing the defect to occur" has been corrected without excess or deficiency, and thus the evaluator may miss the error.

In addition, conventionally, after the developer creates a test code, code review is performed by the evaluator, and thus there is also a problem that it takes time to complete correction of the source code.

Therefore, an object of the present invention is to provide a technique capable of appropriately evaluating a corrected source code and avoiding omissions, errors, and the like of correction with high efficiency.

A source code correction assistance apparatus according to the present invention that solves the above problems, includes a storage device that stores an updated source code updated by a developer based on an input condition causing a defect to occur, and an arithmetic operational device that executes a process of generating, as a template of an evaluation code for evaluating the updated source code, a template including a conditional branch sentence regarding each case of success or failure of the input condition, a process of notifying a terminal of a predetermined evaluator of a creation request of the evaluation code based on the tem e plat, a process of controlling an access to the updated source code by the on evaluator in response to the creation request, a process of receiving editing by the evaluator on a text of the conditional branch sentence in the template, and a process of generating a list of input values for executing all control paths of the evaluation code after the editing and generating an evaluation code driver for automatically executing the evaluation code by inputting the input values.

In addition, there is provided a source code correction assistance method according to the present invention. An information processing apparatus includes a storage device that stores an updated source code updated by a developer based on an input condition causing a defect to occur. The source code correction assistance method executes a process of generating, as a tam plate of an evaluation code for evaluating the updated source code, a template including a conditional branch sentence regarding each case of success or failure of the input condition, a process of notifying a terminal of a predetermined evaluator of a creation request of the evaluation code based on the template, a process of controlling an access to the updated source code by the evaluator in response to the creation request, a process of receiving editing by the evaluator on a text of the conditional branch sentence in the template, and a process of generating a list of input values for executing all control paths of the evaluation code after the editing and generating an evaluation code driver for automatically executing the evaluation code by inputting the input values.

According to the present invention, it is possible to appropriately evaluate a corrected source code and avoid omissions, errors, and the like of correction with high efficiency.

BRIEF DESCRIPTION OF THE DRAWINGS

FIG. 8 is a diagram illustrating an example of a source code in which a defect has occurred in the present embodiment;

FIG. 9 is a diagram illustrating an example of an updated source code in the present embodiment;

FIG. 10 is a diagram illustrating an example of an input condition causing a defect to occur, in the present embodiment;

FIG. 11 is a diagram illustrating a conceptual example of a source code before and after an update in the present embodiment;

FIG. 12 is a diagram illustrating significance of an evaluation code template in the present embodiment;

FIG. 17 is a diagram illustrating an example of addition of the evaluation code template in the present embodiment;

FIG. 18 is a diagram illustrating an example of a branch condition combination review in the present embodiment;

FIG. 19 is a diagram illustrating the example of the branch condition combination review in the present embodiment; and FIG. 20 is a diagram illustrating the example of the branch condition combination review in the present embodiment.

DETAILED DESCRIPTION OF THE EMBODIMENTS

<System Configuration>

Figure 1:
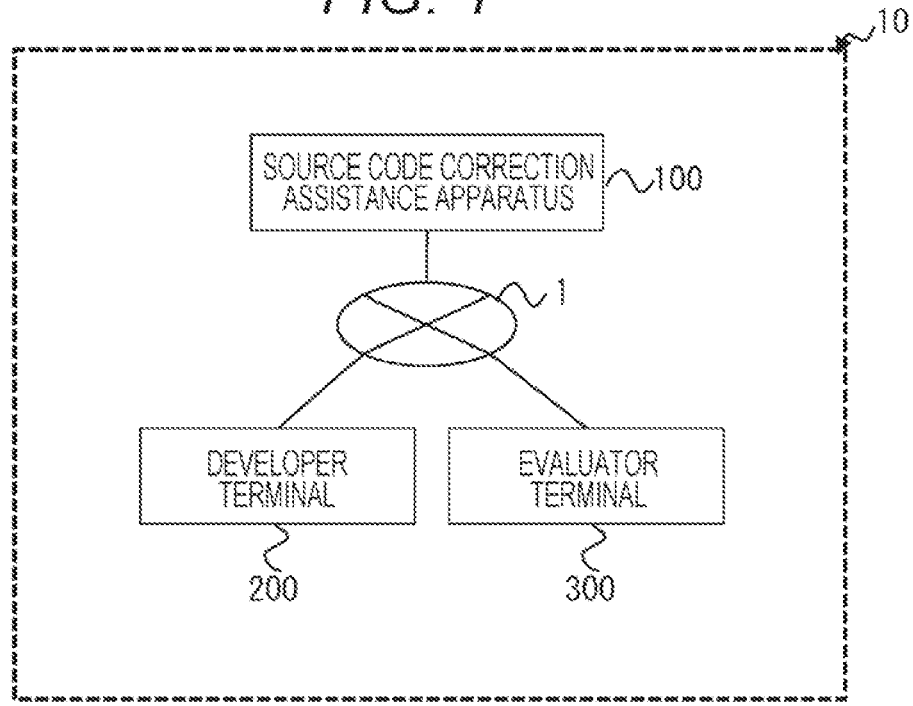
FIG. 1 is a diagram illustrating a network configuration including a source code correction assistance apparatus according to the present embodiment.

Hereinafter, an embodiment of the present invention will be described, in detail with reference to the drawings. FIG. 1 is a diagram illustrating a network configuration example including a source code correction assistance apparatus 100 according to the present embodiment. The source code correction assistance apparatus 100 illustrated in FIG. 1 is a computer capable of appropriately evaluating a corrected source code and avoiding omissions, errors, and the like of correction with high efficiency.

As illustrated in FIG. 1, the source code correction assistance apparatus 100 in the present embodiment is communicably connected to a developer terminal 200 and an evaluator terminal 300 via a network 1. Thus, the source code correction assistance apparatus 100, the developer terminal 200, and the evaluator terminal 300 may be collectively referred to as a source code correction assistance system 10.

The developer terminal 200 is a terminal operated by a developer of software. Specifically, a smartphone, a tablet terminal, a personal computer, or the like can be assumed as the developer terminal 200. The developer is a person who corrects an input condition causing a defect to occur and updates a source code for portions other than the corrected portion. The source code updated by the developer terminal 200, that is, the updated source code is provided for the source code correction assistance apparatus 100 via the network 1.

The evaluator terminal 300 is a terminal operated by an evaluator in response to a request from the source code correction assistance apparatus 100 in the present embodiment. The request, is a creation request of an evaluation code based on a template of the evaluation code for evaluating the updated source code described above. The evaluator is a person different from the developer described above. The evaluator operates the evaluator terminal 300 to edit the text of a conditional branch sentence in the template described above. The evaluator terminal 300 provides the source code correction assistance apparatus 100 with the content edited by the evaluator.

<Hardware Configuration>

Figure 2:
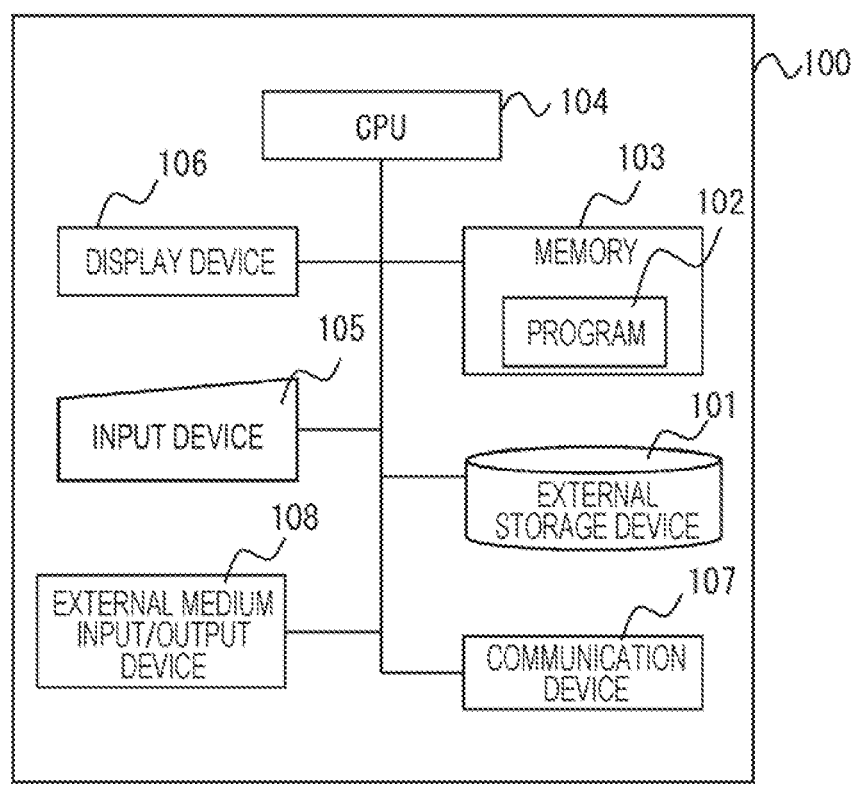
FIG. 2 is a diagram illustrating a hardware configuration example, of the source code correction assistance apparatus in the present embodiment.

A hardware configuration of the source code correction assistance apparatus 100 in the present embodiment is as follows in FIG. 2. That is, the source code correction assistance apparatus 100 includes an external storage device 101, a memory 103, a CPU 104, an input device 105, a display device 106, a communication device 107, and an external medium input/output device 108.

Among such devices, the external storage device 101 is configured by an appropriate non-volatile storage element such as a solid state drive (SSD) or a hard disk drive.

The memory 103 is configured by a volatile storage element such as a RAM.

The CPU 104 is an arithmetic operational device that reads and executes a program 102 stored in the external storage device 101 into the memory 103 to collectively control the apparatus itself, and to perform various determinations, arithmetic operations, and control processes.

As the input device 105, a keyboard, a mouse, a microphone, or the like that receives a key input or a voice input from the user is assumed.

As the display device 106, a display that displays processing data by the CPU 104 is assumed.

As the communication device 107, a network interface card or the like that is connected to the network 1 and is responsible for a communication process with the developer terminal 200 and the evaluator terminal 300 is assumed.

As the external medium input/output device 108, an interface connected to an external storage medium such as a DVD or a USE memory to be able to transmit and receive data to and from the external storage medium is assumed.

The external storage device 101 stores at least an evaluator address 125 in addition to the program 102 for implementing a function necessary as the source code correction assistance apparatus in the present embodiment (described later). The external storage device 101 or the memory 103 temporarily stores a defect occurrence input condition 126, an updated source code 127, a pre-update source cods 128, and an evaluation code 129 in accordance with at least a time required for processing.

<Functional Configuration>

Figure 3:
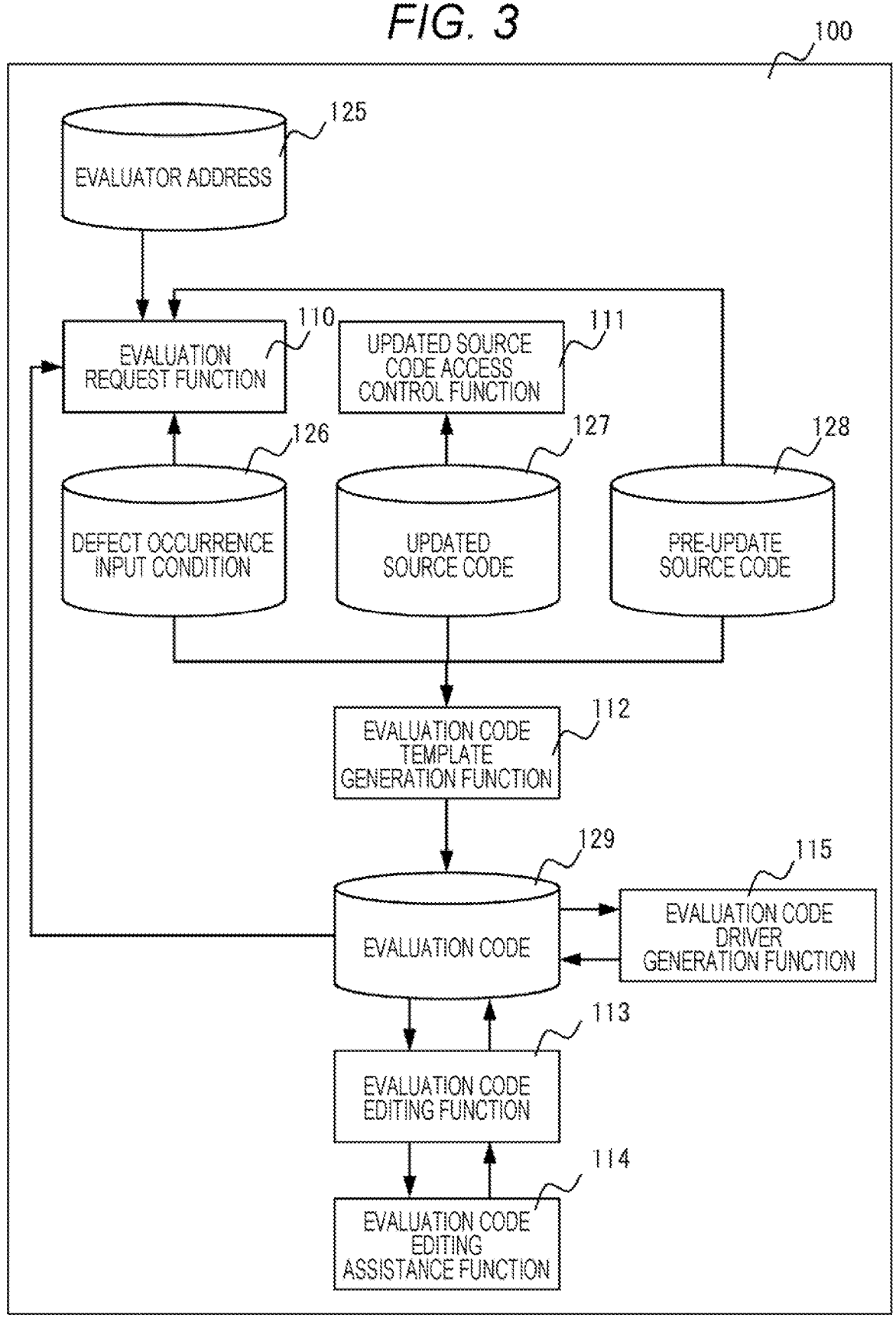
FIG. 3 is a diagram illustrating a block configuration example of the source code correction assistance apparatus in the present embodiment.
Figure 4:
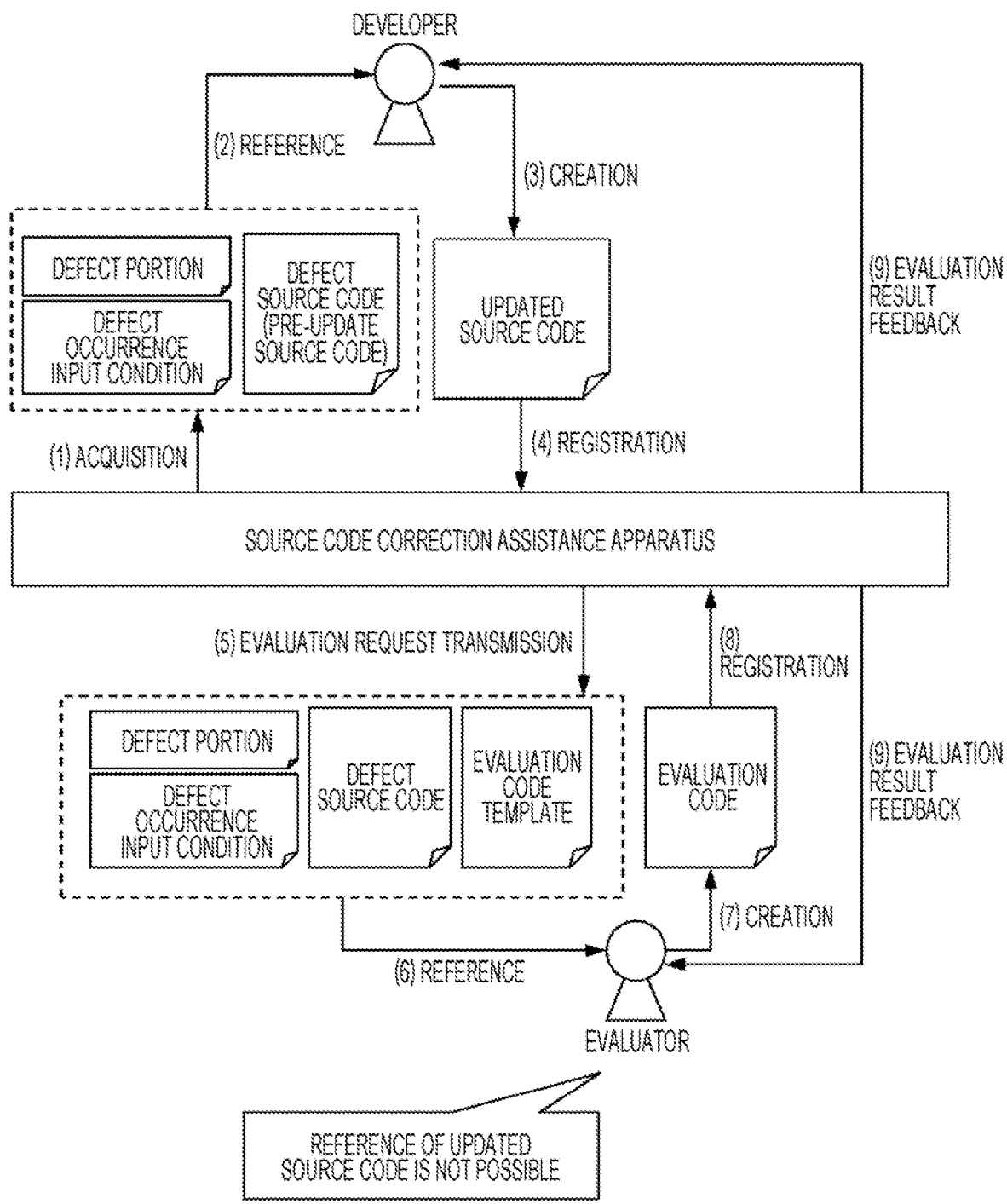
FIG. 4 is a conceptual diagram illustrating a flow of source code correction and evaluation in the present embodiment.

Next, a configuration of the source code correction assistance apparatus 100 in the present embodiment will be described. FIG. 3 is a diagram illustrating a block configuration example of the source code correction assistance apparatus 100 in the present embodiment. FIG. 4 is a conceptual diagram illustrating a flow of source code correction and evaluation in the present embodiment.

The source code correction assistance apparatus 100 in the present embodiment includes functions of an evaluation request function 110, an updated source code access control function 111, an evaluation code template generation function 112, an evaluation code editing function 113, an evaluation code editing assistance function 114, and an evaluation code driver generation function 115. The functions are implemented by the CPU 104 executing the program 102.

It is assumed that the source code correction assistance apparatus 100 stores each type of data of the evaluator address 125, the defect occurrence input condition 126, the updated source code 127, the pre-update source code 128, and the evaluation code 129, in the external storage device 101 or the memory 103 with the process in each function described above.

Among the above functions, the evaluation request function 110 notifies the evaluator terminal 300 of an evaluator specified based on the evaluator address 125 of a creation request of the evaluation code 129 based on a template. Such a template is a template of an evaluation code for evaluating the updated source code 127. The updated source code 127 is a source code corrected and updated by the developer based on the input condition 126 causing a defect to occur.

The updated source code 127 is a result obtained by the developer performing correction for solving the defect and reviewing the description of all source codes after the correction, based on a defect occurrence portion occurring with respect to a defect source code, that is, a pre-update source code and an input condition thereof. The updated source code 127 is registered in the source code correction assistance apparatus 100 from the developer terminal 200.

Among the functions of the source code correction assistance apparatus 100 described above, the updated source code access control function 111 controls a person who can access the updated source code 127 only to the developer. It can be assumed that such control is performed, for example, based on identification information of the developer, which is stored in advance.

The evaluation code template generation function 112 generates a template including a conditional branch sentence regarding each case of success or failure of the above-described input condition 126, as a template of the evaluation code for evaluating the updated source code 127.

The evaluation code editing function 113 receives editing by the evaluator on the text of the conditional branch sentence in the above-described template.

The evaluation code editing assistance function 114 receives an input of combining conditional branch sentences in response to a determination by the evaluator that a specific conditional branch sentence based on a boundary value, of a variable is unnecessary, in consideration of a clause constituting a path constraint condition obtained for the updated source code 127 and the conditional branch sentence based on the boundary value of the variable constituting the clause. In addition, the evaluation code editing assistance function 114 displays a result obtained by combining the conditional branch sentences, on the screen. In addition, the evaluation code editing assistance function 114 receives editing by the evaluator on the text of the conditional branch sentence in this screen display, and reflects the editing result in the above-described template.

The evaluation code driver generation function 115 generates a list of input values for executing all the control paths of the evaluation code edited by the evaluator described above, and generates an evaluation code driver for automatically executing the evaluation code by inputting the input, value. In addition, the evaluation code driver generation function 115 determines the satisfiability of a branch condition in the conditional branch sentence created with respect to the above-described template, and deletes the branch condition when the branch condition is not satisfiable.

<Flow Example: Evaluation Request Function>

An actual procedure of a source code correction assistance method in the present embodiment will be described below with reference to the drawings. Various operations corresponding to the source code correction assistance method described below are realized by a program that is read into the memory or the like and executed by the source code correction assistance apparatus 100. The program includes codes for performing various operations described below.

Figure 5:
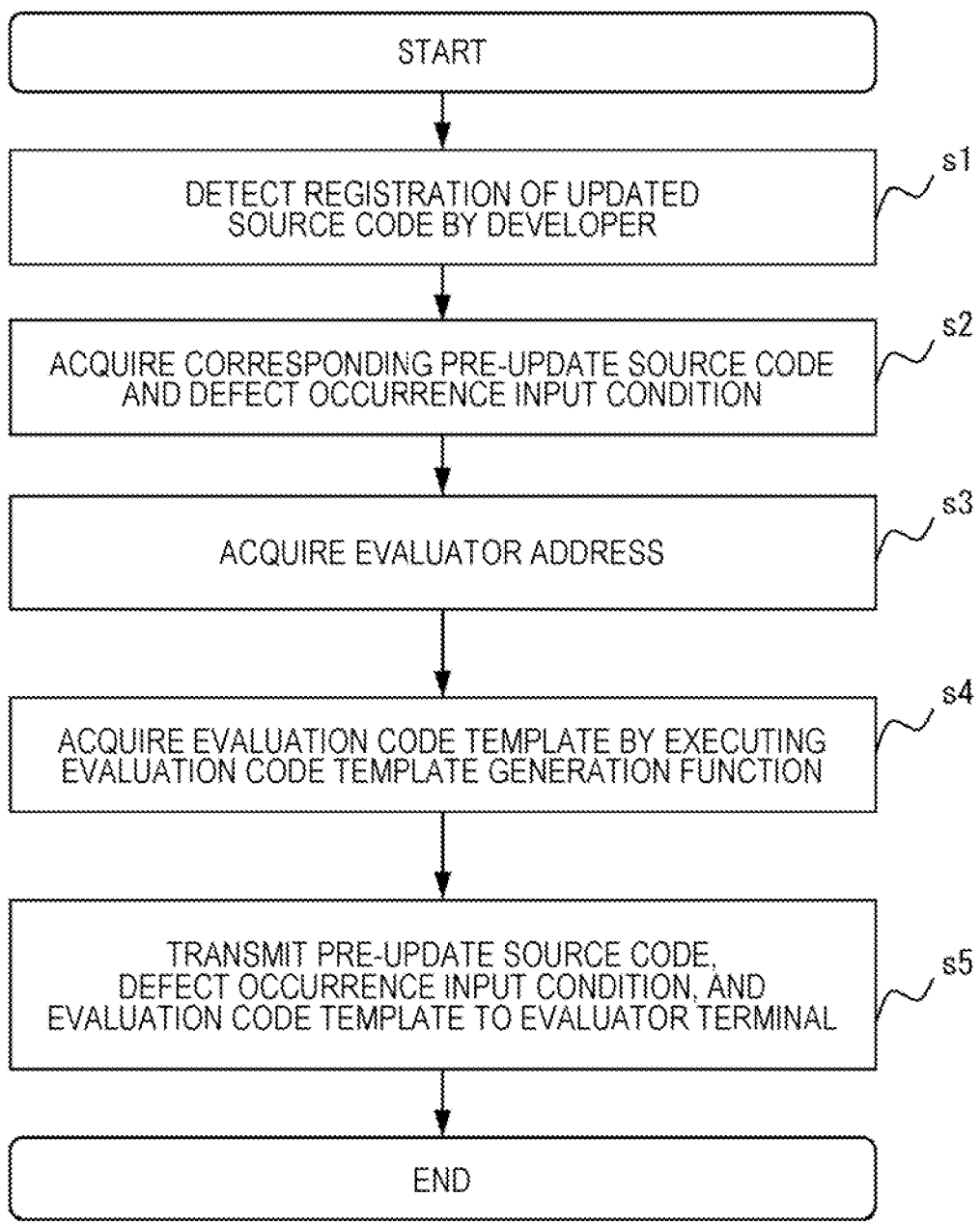
FIG. 5 is a diagram illustrating a flow example of a source code correction assistance method according to the present embodiment.

FIG. 5 is a diagram illustrating a flow example of the source code correction assistance method in the present embodiment. In this case, the evaluation request function 110 of the source code correction assistance apparatus 100 receives transmission of the updated source code 127 from the developer terminal 200 and detects the transmission (s1).

Then, the above-described evaluation request function 110 acquires the pre-update source code 128 corresponding to the updated source code 127 and the defect occurrence input condition 126 (s2).

For this process, it is assumed that the source code correction assistance apparatus 100 stores the updated source code 127 and the pre-update source code 128 in the external storage device 101 in association with each other. It is assumed that the defect occurrence input condition 126 is obtained by symbolic execution described later.

Figure 6:
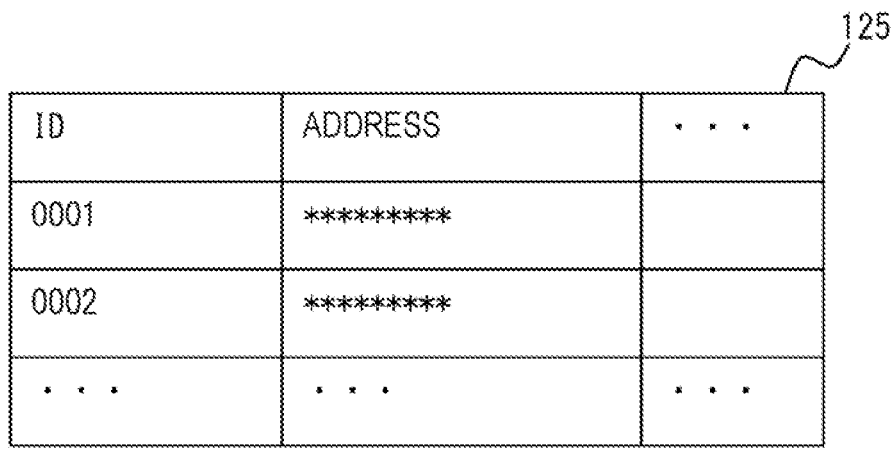
FIG. 6 is a diagram illustrating a configuration example of an evaluator address in the present embodiment.
Figure 7:
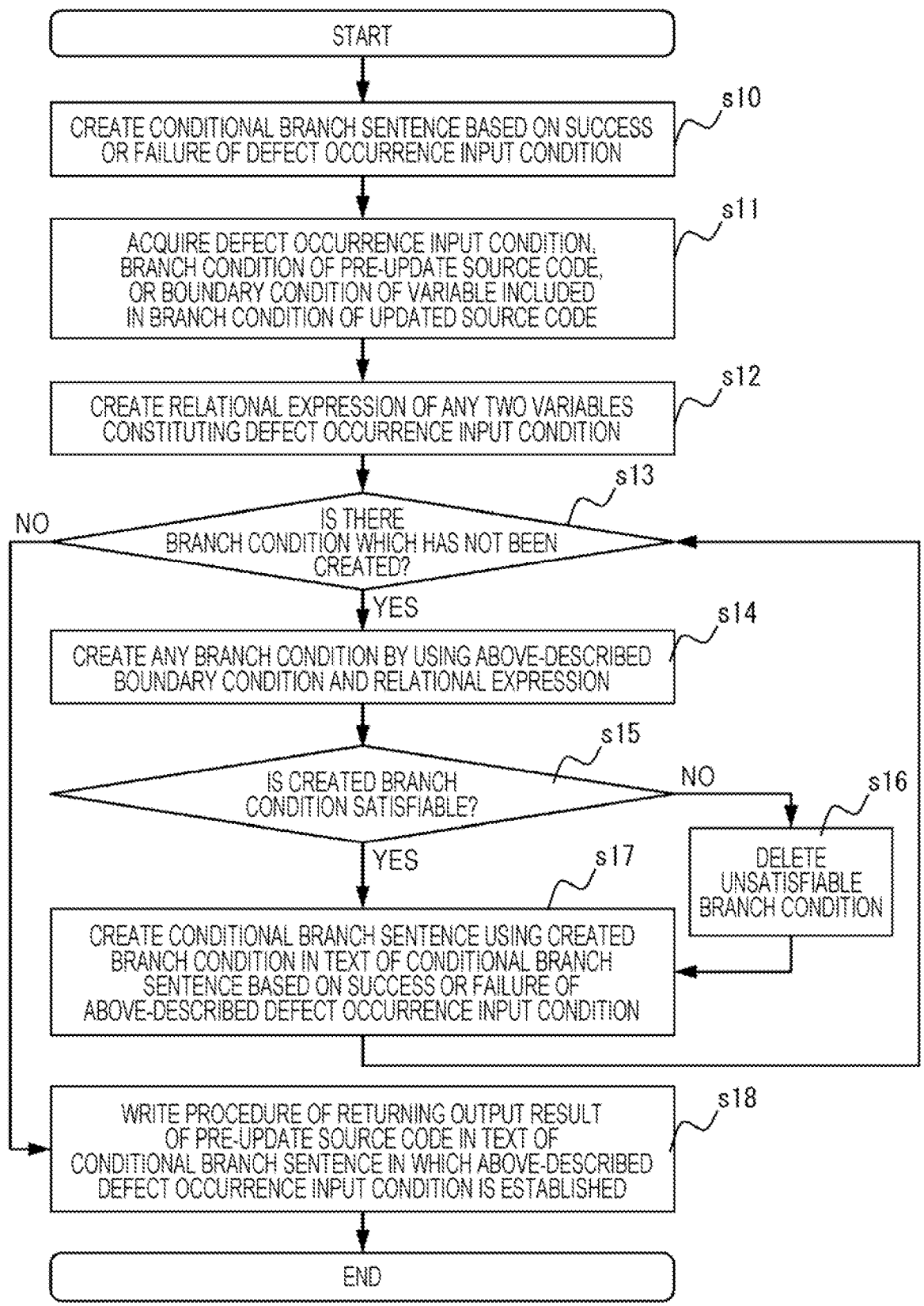
FIG. 7 is a diagram illustrating another flow example of the source code correction assistance method in the present embodiment.

Then, the above-described evaluation request function 110 acquires the evaluator address 125 from the external storage device 101 (s3). As illustrated in FIG. 6, the above-described evaluator address 125 is an aggregate of records associated with the address of the evaluator, by using an ID for uniquely specifying the evaluator as a key. As the address in this case, a mail address or an IP address assigned to the evaluator terminal 300 is assumed.

The above-described evaluation request function 110 acquires the evaluation code template by executing the evaluation code template generation function 112 (s4). Details of a process in the evaluation code template generation function 112 will be described later.

The above-described evaluation request function 110 transmits the pre-update source code 128, the defect occurrence input condition 126, and the evaluation code template obtained in s4 to the evaluator terminal 300 (s5), and ends the processing.

<Flow Example: Evaluation Code Template Generation Function>

Next, a processing flow in the above-described evaluation code template generation function 112 will be described with reference to FIGS. 7 to 13. In this case, the evaluation code template generation function 112 of the source code correction assistance apparatus 100 creates a conditional branch sentence based on the success failure of the defect occurrence input condition 126 (s10).

In addition, the evaluation code template generation function 112 acquires the defect occurrence input condition 126, the branch condition of the pre-update source code 128, or a boundary condition of a variable included in the branch condition of the updated source code 127 (s11).

FIG. 8 illustrates a specific example of the above-described pre-update source code 128. The pre-update source code 128 is a source code in which a defect has occurred. In the example illustrated in FIG. 8, the source code is a source code in which a defect (specification not coincidence) that the code is "low" although the code should be "high" when x=0 and y=0 has occurred.

FIG. 9 illustrates a specific example of the updated source code 127. The updated source code 127 is a source code that has been updated by the developer correcting a portion related to the above-described defect and performing a review as a whole in consideration of readability and the like. Here, an error when x==0 and y==0 has been corrected by the developer, but a so-called zero split occurs when (x<0 and y==0) or (x>0 and y==0). That is, the updated source code includes a new defect.

In this case, the evaluation code template generation function 112 performs symbolic execution on the updated source code 127, and acquires an input condition causing the defect to occur, that is, the defect occurrence input condition 126 (see FIG. 10).

FIG. 11 illustrates the defects in the source codes before and after the update illustrated in FIGS. 8 to 10, for each region on an xy coordinate plane. As described above, the defect occurrence input condition 126 in the pre-update source code 128 is the case of x=0 and y=0, and a point on the origin coordinates corresponds to this defect. On the other hand, the defect occurrence input condition 126 in the updated source code 127 is the case of (x<0 and y==0) or (x>0 and y==0), and corresponds to a line segment region other than x=0 on the y axis.

FIG. 12 illustrates the significance of evaluation code template generation. As illustrated in FIG. 12, it assumed that the defect occurrence input condition 126 obtained by performing symbolic execution on the pre-update source code 128 is "path constraint α", "path constraint β", and "path constraint γ".

As a result of the developer correcting or updating the source code in order to solve the defect occurrence input condition. 126, the boundary of the defect occurrence input condition 126 is embedded in the updated source code. Therefore, when only the updated source code 127 is reviewed, there is a high probability that an error in correction or update by the developer is missed. Thus, it is meaningful to reduce such miss of the correction error by the evaluation code template.

The evaluation code template generation function 112 creates a relational expression of any two variables constituting the defect occurrence input condition 126 (s12). In the example of the evaluation code template illustrated in FIG. 13, the relationship (x==y) between the variable x and the variable y is adopted as the branch condition.

Figure 13:
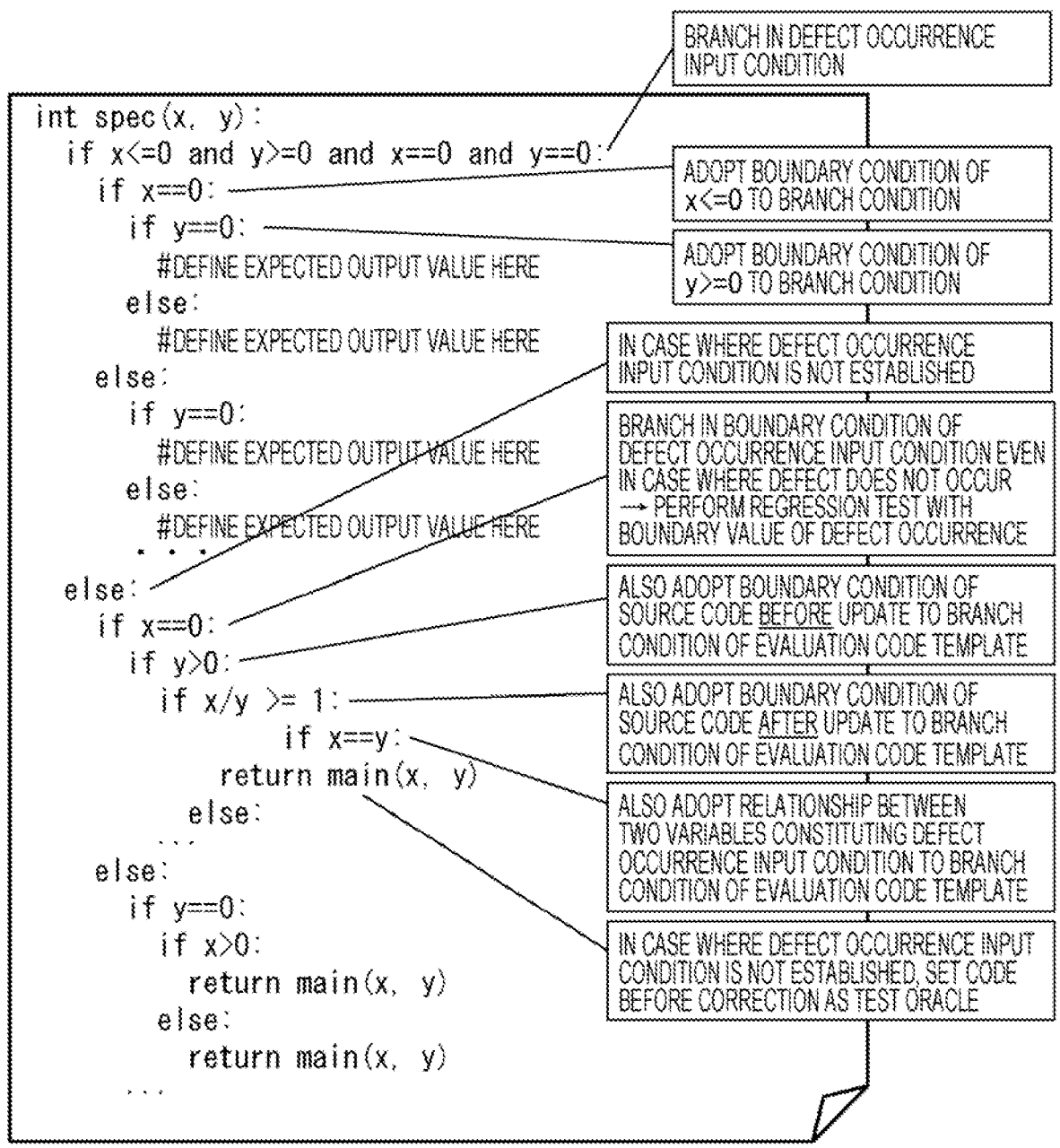
FIG. 13 is a diagram illustrating an example of the evaluation code template in the present embodiment.

The example of the evaluation code template illustrated in FIG. 13 illustrates a state in which, in addition to the specific example of the relational expression of the two variables, a branch condition for defining a branch in the defect occurrence input condition 126, a branch condition defined by a boundary condition related to the variable x, a branch condition defined by a boundary condition related to the variable y, a branch condition defined by a boundary condition of the pre-update source code 128, and the like axe generated and described for each case of success and failure of the defect occurrence input condition.

Then, the evaluation code template generation function 112 determines whether there, is a branch condition for which a relational expression has not been created in the conditional branch sentence created in s10 described above, (s13).

When there is no branch condition for which the relational expression has not been created (s13: No) as a result of the above-described determination, the evaluation code template generation function 112 causes the process to transition to s18.

On the other hand, when there is a branch condition for which the relational expression has not been created (s13: Yes) as a result of the above-described determination, the evaluation code template generation function 112 creates a branch condition by using the above-described boundary condition and relational expression (s14).

Then, the evaluation code template generation function 112 determines whether the created branch condition is satisfiable (s15). This determination may be performed by using a known solver.

When the created branch condition is not satisfiable (s15: No) as a result of the above-described determination, the evaluation code template generation function 112 deletes the unsatisfiable branch condition (s16), and causes the process to transition to s17.

On the other hand, when the created branch condition is satisfiable (s15: Yes) as a result of the above-described determination, the evaluation code template generation function 112 creates a conditional branch sentence using the branch condition created in s10 in the text of the conditional branch sentence based on the success or failure of the above-described defect occurrence input condition 126 (s17), and returns the process to s13.

The evaluation code template generation function 112 writes a procedure of returning the output result of the pre-update source code 128 in the text of the conditional branch sentence in which the above-described defect occurrence input condition 126 is established (s18), and ends the processing.

<Flow Example: Evaluation Code Driver Generation Function>

Figure 14:
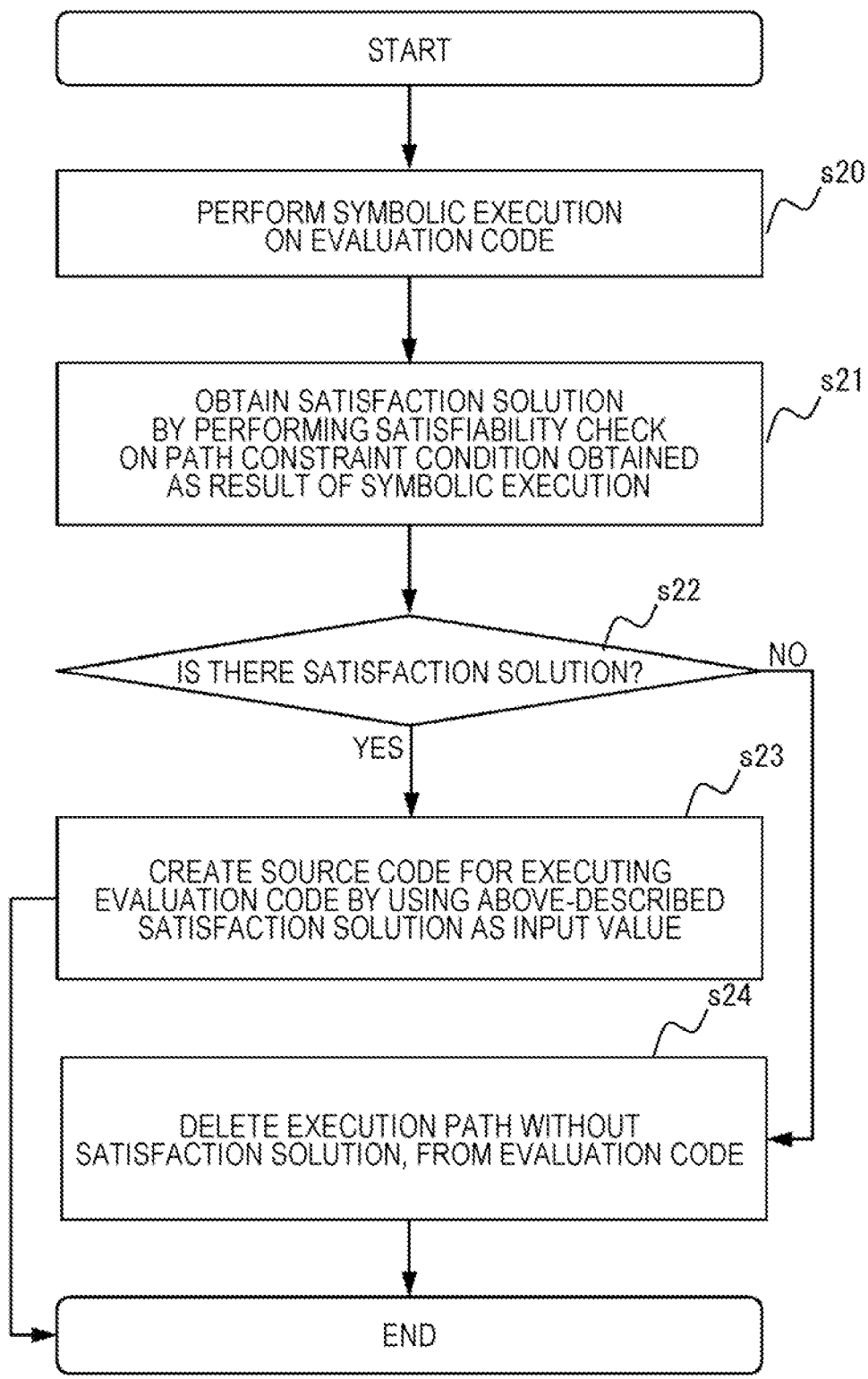
FIG. 14 is a diagram illustrating still another flow example of the source code correction assistance method in the present embodiment.

Next, a processing flow in the above-described evaluation code driver generation function 115 will be described with reference to FIGS. 14 and 15. In this case, the evaluation code driver generation function 115 of the source code correction assistance apparatus 100 performs symbolic execution on the evaluation code (s20). Thus, the evaluation code driver generation function 115 acquires ail paths and creates a test input value passing through the path (FIG. 15).

Figure 15:
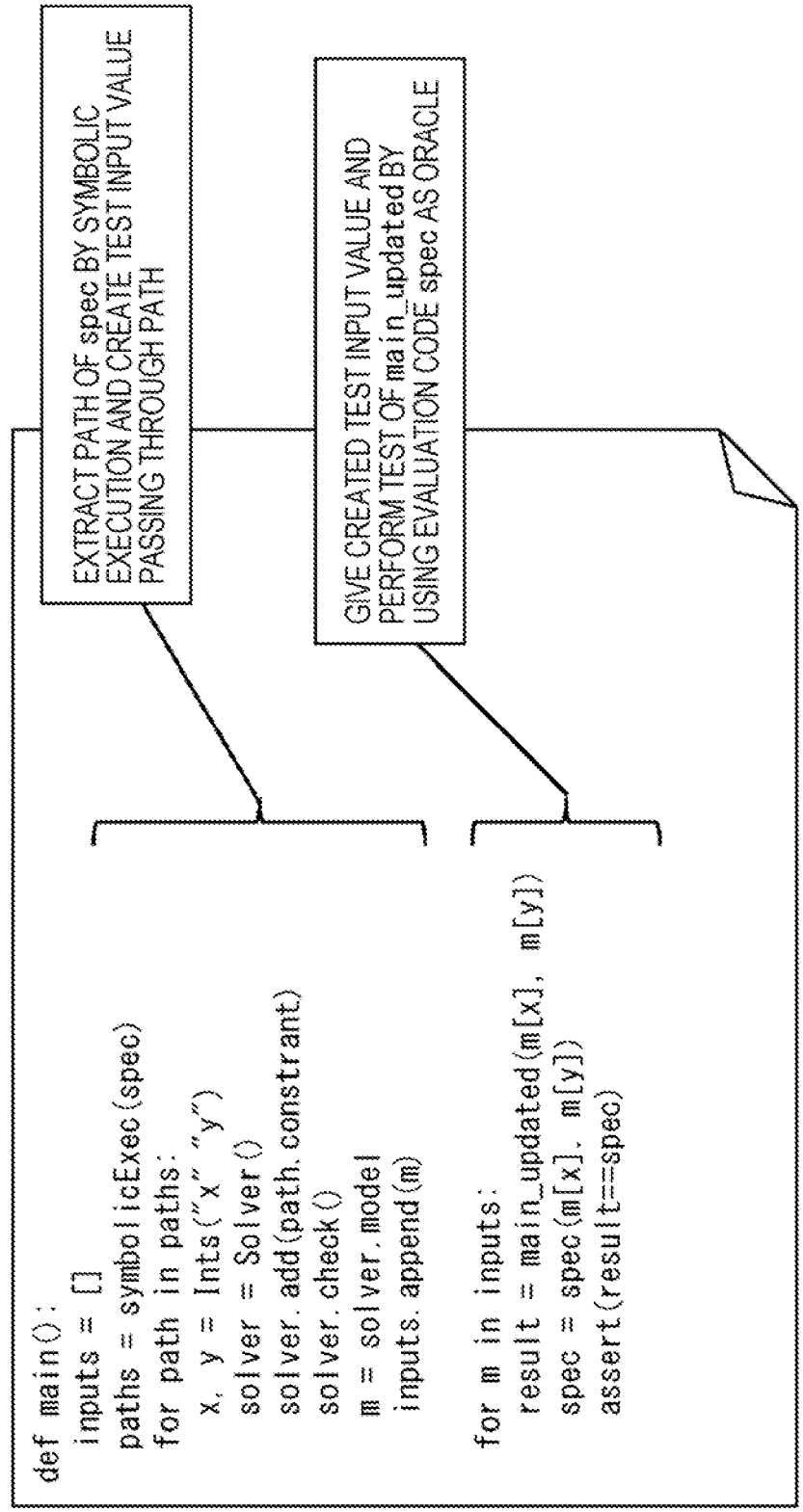
FIG. 15 is a diagram illustrating an example of an evaluation code driver in the present embodiment.
Figure 16:
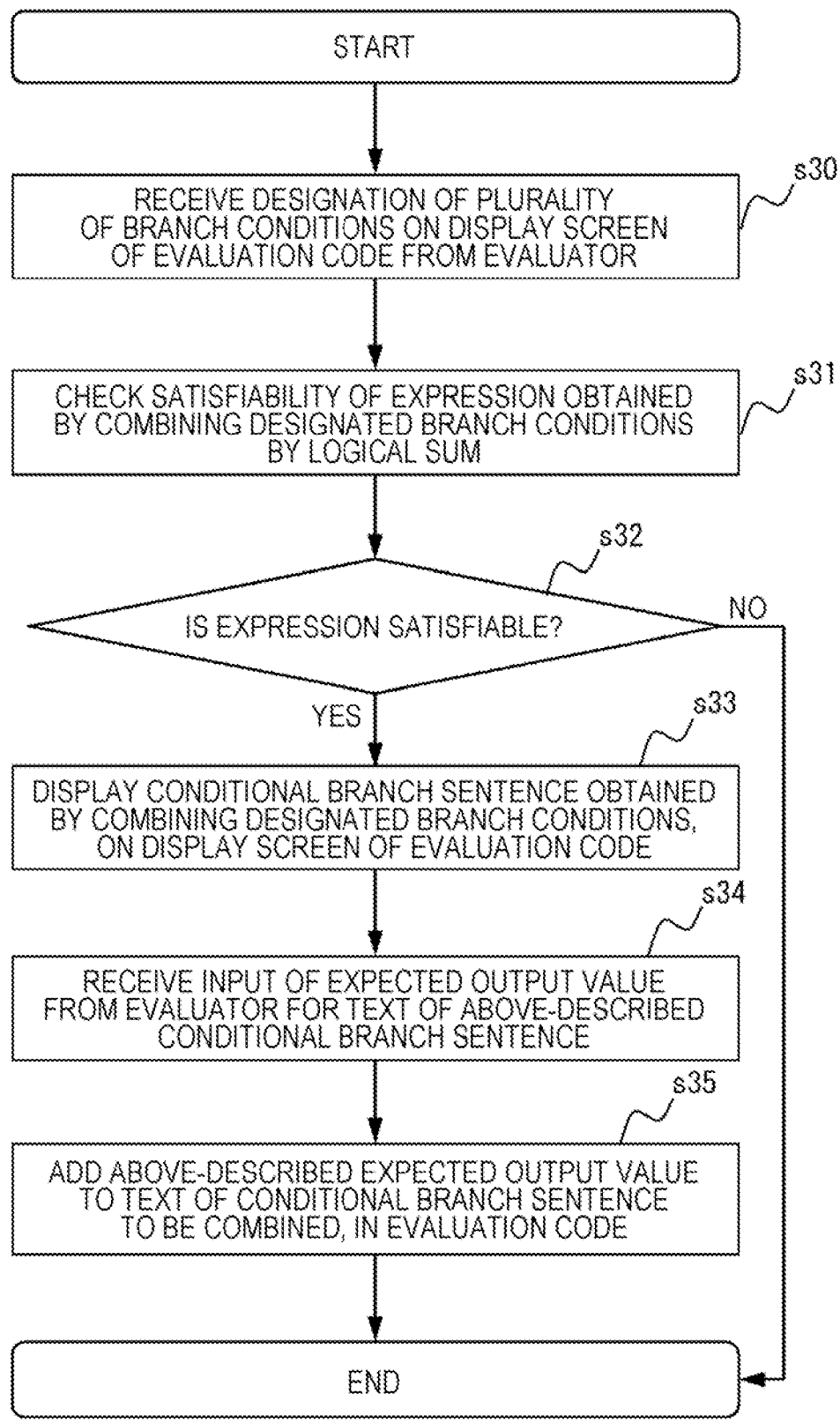
FIG. 16 is a diagram illustrating still yet another flow example of the source code correction assistance method in the present embodiment.

In addition, the evaluation code driver generation function 115 obtains a satisfaction solution by performing a satisfiability check on a path constraint condition obtained by the above-described symbolic execution ("symbolicExec (spec)" in FIG. 15) (s21).

Then, the evaluation code driver generation function 115 determines whether the satisfaction solution is obtained as a result of s21 (s22).

When the satisfaction solution is not obtained as a result of the determination (s22: No), the evaluation code driver generation function 115 causes the process to transition to s24.

On the other hand, when the satisfaction solution is obtained (s22: Yes) as a result of the above-described determination, the evaluation code driver generation function 115 gives the above-described satisfaction solution as the test input value (FIG. 15: m), and creates a source code for performing a test of the updated source code 127 (FIG. 15: main_updated (m[x], m[y])) with the evaluation code (FIG. 15: "spec") as an oracle (s23). Then, the evaluation code driver generation function 115 ends the processing.

Then, the evaluation code driver generation function 115 deletes the execution path having no satisfaction solution from the evaluation code (s24), and ends the processing.

<Flow Example: Evaluation Code Editing Assistance Function>

Next, a processing flow in the above-described evaluation code editing assistance function 114 will be described with reference to FIGS. 16 to 20. In this case, the evaluation code editing assistance function 114 receives a designation of a plurality of branch conditions from the evaluator terminal 300 on the display screen of the evaluation code (s30). In a view illustrated in FIG. 18, "if y==0" and "else" are designated, and the "combine" button is pressed.

In addition, the evaluation code editing assistance function 114 checks the satisfiability of an expression obtained by combining the designated branch conditions by the logical sum by the known solver in accordance with the designation and the combination instruction (s31).

Then, when the combined expression is not satisfiable (s32: No) as a result of the above-described satisfiability check, the evaluation code editing assistance function 114 ends the processing.

On the other hand, when the combined expression is satisfiable (s32: Yes) as a result of the above-described determination, the evaluation code editing assistance function 114 displays a conditional branch sentence obtained by combining the designated branch conditions on the display screen of the evaluation code (s33). In the view illustrated in FIG. 19, the branch condition designated in the above-described step s30 is merged and displayed on the evaluator terminal 300.

Then, the evaluation code editing assistance function 114 receives an input of an expected output value from the evaluator for the text of the conditional branch sentence (s34). It is assumed that the output value received here is, fox example, "return "x is high"".

In addition, the evaluation code editing assistance function 114 adds the expected output value to the text of the conditional branch sentence to be combined in the evaluation code (s35), and ends the processing. In the view illustrated in FIG. 19, "return "x is high"", which is the output value (expected value) input from the evaluator terminal 300, is added to the merged conditional branch sentence. As illustrated in FIG. 20, in the evaluation code editing assistance function 114, it is assumed that the above-described merge is performed only on a view and is not performed on an actual code.

Although the best mode and the like for carrying out the present invention have been specifically described above, the present invention is not limited thereto, and various modifications can be made without departing from the gist thereof.

According to the present embodiment in this manner, a user different from the developer evaluates the corrected source code without prejudice, and thus the probability of missing the correction error is reduced. In addition, for the input condition causing a defect to occur, since the logical boundary and the numerical boundary can be evaluated without omission, there is a low probability of missing a correction omission, a correction error, and a regression (collectively referred to as correction errors below). Furthermore, since it is possible to shorten an evaluation work conventionally performed in two steps of test code creation and code review, to one step of evaluation code creation, it is possible to shorten the time taken for source code correction.

That is, it is possible to appropriately evaluate a corrected source code and avoid omissions, errors, and the like of correction with high efficiency.

With the description of the present specification, at least the followings are apparent. That is, in the source code correction assistance apparatus in the present embodiment, the arithmetic operational device may describe a procedure of evaluating whether an output result of the source code before an update coincides with an output result of the updated source code in the text of the conditional branch sentence in a case where the input condition is not established when the template is generated.

According to this, it is possible to efficiently verify the consistency between the source codes before and after the update from the output value. As a result, it is possible to appropriately evaluate a corrected source code and avoid omissions, errors, and the like of correction with higher efficiency.

In addition, in the source code correction assistance apparatus in the present embodiment, the arithmetic operational device may describe a clause constituting a path constraint condition obtained by performing symbolic execution on a source code before an update and a conditional branch sentence based on a boundary value of a variable constituting the clause, for each case of success or failure of the input condition when the template is generated.

According to this, even in a case where, for example, the defect occurrence condition before the update is not established, it is possible to describe the conditional branch under the boundary condition of the defect occurrence condition and perform a regression test at the boundary value of the defect occurrence. As a result, tis possible to appropriately evaluate a corrected source code and avoid omissions, errors, and the like of correction with higher efficiency.

In the source code correction assistance apparatus in the present embodiment, the arithmetic operational device may describe a clause constituting a path constraint condition obtained by performing symbolic execution on the updated source code and a conditional branch sentence based on a boundary value of a variable constituting the clause, for each case of success or failure of the input condition when the template is generated.

According to this, it is easy to accurately avoid omission and the like of correction by completely evaluating the logical-path boundary and the numerical boundary for the input condition causing the defect to occur. As a result, it is possible to appropriately evaluate a corrected source code and avoid omissions, errors, and the like of correction with higher efficiency.

Furthermore, in the source code correction assistance apparatus in the present embodiment, the arithmetic operational device may describe a conditional branch sentence based on a relational expression between any two variables constituting the input condition, for each case of success or failure of the input condition when the template is generated.

According to this, it is easy to describe the conditional branch consideration of the relationship between variables and accurately avoid omission and the like of correction. As a result, it is possible to appropriately evaluate a corrected source code and avoid omissions, errors, and the like of correction with higher efficiency.

Furthermore, in the source code correction assistance apparatus in the present embodiment, the arithmetic operational device may execute a process of receiving an input of combining conditional branch sentences in response to a determination by the evaluator that the specific conditional branch sentence based on a boundary value of a variable is unnecessary, in consideration of a clause constituting a path constraint condition obtained for the updated source code and the conditional branch sentence based on the boundary value of the variable constituting the clause, and performing a screen display of a result obtained by combining the conditional branch sentences, and a process of, in the screen display, receiving editing by the evaluator on a text of the conditional branch sentence and reflecting a result of the editing to the template.

According to this, it is possible to accurately and efficiently handle deletion of an unnecessary conditional branch sentence. As a result, it is possible to appropriately evaluate a corrected source code and avoid omissions, errors, and the like of correction with higher efficiency.

Furthermore, in the source code correction assistance apparatus in the present embodiment, the arithmetic operational device may determine satisfiability of a branch condition of the conditional branch sentence created for the template, and delete the branch condition when the branch condition is not satisfiable.

According to this, it is possible to efficiently maintain the quality of the template and the evaluation code based on the template. As a result, it is possible to appropriately evaluate a corrected source code and avoid omissions, errors, and the like of correction with higher efficiency.

What is claimed is:

1. A source code correction assistance apparatus comprising:
    a storage device that stores an updated source code updated by a developer based on an input condition causing a defect to occur; and
    an arithmetic operational device including one or more processors that executes:
    a process of generating, as a template of an evaluation code for evaluating the updated source code, a template including a conditional branch sentence regarding each case of success or failure of the input condition,
    a process of notifying a terminal of a predetermined evaluator of a creation request of the evaluation code based on the template,
    a process of controlling an access to the updated source code by the evaluator in response to the creation request,
    a process of receiving editing by the evaluator on a text of the conditional branch sentence in the template, and
    a process of generating a list of input values for executing all control paths of the evaluation code after the editing, wherein the list of input values is generated in response to a determination by the evaluator that the specific conditional branch sentence is based on a boundary value of a variable that is unnecessary, and generating an evaluation code driver that automatically executes the evaluation code by inputting the input values.

2. The source code correction assistance apparatus according to claim 1, wherein
    the arithmetic operational device describes a procedure of evaluating whether an output result of the source code before an update coincides with an output result of the updated source code in the text of the conditional branch sentence in a case where the input condition is not established when the template is generated.

3. The source code correction assistance apparatus according to claim 1, wherein
    the arithmetic operational device describes a clause constituting a path constraint condition obtained by performing symbolic execution on a source code before an update and a conditional branch sentence based on a boundary value of a variable constituting the clause, for each case of success or failure of the input condition when the template is generated.

4. The source code correction assistance apparatus according to claim 1, wherein
the arithmetic operational device describes a clause constituting a path constraint condition obtained by performing symbolic execution on the updated source code and a conditional branch sentence based on a boundary value of a variable constituting the clause, for each case of success or failure of the input condition when the template is generated.

5. The source code correction assistance apparatus according to claim 1, wherein
the arithmetic operational device describes a conditional branch sentence based on a relational expression between any two variables constituting the input condition, for each case of success or failure of the input condition when the template is generated.

6. The source code correction assistance apparatus according to claim 1, wherein
the arithmetic operational device executes
a process of receiving an input of combining conditional branch sentences in response to a determination by the evaluator that the specific conditional branch sentence based on a boundary value of a variable is unnecessary, in consideration of a clause constituting a path constraint condition obtained for the updated source code and the conditional branch sentence based on the boundary value of the variable constituting the clause, and performing a screen display of a result obtained by combining the conditional branch sentences, and
a process of, in the screen display, receiving editing by the evaluator on a text of the conditional branch sentence and reflecting a result of the editing to the template.

7. The source code correction assistance apparatus according to claim 1, wherein
the arithmetic operational device determines satisfiability of a branch condition of the conditional branch sentence created for the template, and deletes the branch condition when the branch condition is not satisfiable.

8. A source code correction assistance method, wherein
an information processing apparatus comprises a storage device that stores an updated source code updated by a developer based on an input condition causing a defect to occur, and
the source code correction assistance method executes:
a process of generating, as a template of an evaluation code for evaluating the updated source code, a template including a conditional branch sentence regarding each case of success or failure of the input condition;
a process of notifying a terminal of a predetermined evaluator of a creation request of the evaluation code based on the template;
a process of controlling an access to the updated source code by the evaluator in response to the creation request;
a process of receiving editing by the evaluator on a text of the conditional branch sentence in the template; and
a process of generating a list of input values for executing all control paths of the evaluation code after the editing, wherein the list of input values is generated in response to a determination by the evaluator that the specific conditional branch sentence is based on a boundary value of a variable that is unnecessary, and generating an evaluation code driver for automatically executing the evaluation code by inputting the input values.

* * * * *